United States Patent
Matsumoto et al.

(10) Patent No.: US 11,696,866 B2
(45) Date of Patent: Jul. 11, 2023

(54) WALKING TRAINING SYSTEM AND OPERATION METHOD

(71) Applicant: TOYOTA JIDOSHA KABUSHIKI KAISHA, Toyota (JP)

(72) Inventors: Taiga Matsumoto, Nagoya (JP); Issei Nakashima, Toyota (JP); Yo Sato, Miyoshi (JP); Masayuki Imaida, Ichinomiya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 457 days.

(21) Appl. No.: 17/003,368

(22) Filed: Aug. 26, 2020

(65) Prior Publication Data
US 2021/0113419 A1   Apr. 22, 2021

(30) Foreign Application Priority Data
Oct. 16, 2019   (JP) .................. 2019-189213

(51) Int. Cl.
*A61H 3/00* (2006.01)
*A63B 22/02* (2006.01)

(52) U.S. Cl.
CPC ............ *A61H 3/008* (2013.01); *A63B 22/02* (2013.01); *A61H 2003/007* (2013.01); *A61H 2201/149* (2013.01); *A61H 2201/1635* (2013.01); *A61H 2201/1652* (2013.01); *A61H 2201/5002* (2013.01); *A61H 2203/0406* (2013.01)

(58) Field of Classification Search
CPC ............ A61H 3/008; A61H 2003/007; A61H 2201/149; A61H 2201/1635; A61H 2201/1652; A61H 2201/5002; A61H 2203/0406; A63B 22/02; A63B 21/154; A63B 21/4009; A63B 69/0057; A63B 2022/0092; G09B 23/28

See application file for complete search history.

(56) References Cited

U.S. PATENT DOCUMENTS 3,083,037 A * 3/1963 Gordon .................. A63B 19/04
                                                              482/146
3,408,067 A * 10/1968 Armstrong ............. A63B 22/02
                                                              472/91

(Continued)

FOREIGN PATENT DOCUMENTS

| CN | 102068363 A | 5/2011 |
| CN | 104587636 A | 5/2015 |

(Continued)

*Primary Examiner* — Garrett K Atkinson
(74) *Attorney, Agent, or Firm* — Oliff PLC (57) ABSTRACT

A walking training system according to this embodiment includes a harness, at least three pulling units, and a control unit configured to control the at least three pulling units in such a way that a position of the harness in a horizontal plane becomes a target position. One of the at least three pulling units is a first pulling unit configured to apply a pulling force to the harness from front of the trainee, another one of the at least three pulling units is a second pulling unit configured to apply a pulling force to the harness from rear of the trainee, and another one of the at least three pulling units is a third pulling unit configured to apply a pulling force to the harness from a direction different from the first and second pulling units.

13 Claims, 4 Drawing Sheets

(56) References Cited

U.S. PATENT DOCUMENTS

| | | | | |
|---|---|---|---|---|
| 4,204,673 | A * | 5/1980 | Speer, Sr. | A63B 22/0292 601/40 |
| 4,423,864 | A * | 1/1984 | Wiik | A63B 22/203 472/91 |
| 4,733,858 | A * | 3/1988 | Lan | A63B 21/4047 482/53 |
| 5,314,390 | A * | 5/1994 | Westing | A63B 21/4034 601/36 |
| 5,830,162 | A * | 11/1998 | Giovannetti | A61B 5/1038 482/69 |
| 6,880,487 | B2 * | 4/2005 | Reinkensmeyer | A01K 15/027 119/728 |
| 7,125,388 | B1 * | 10/2006 | Reinkensmeyer | A63B 69/0064 601/5 |
| 7,381,163 | B2 * | 6/2008 | Gordon | A63B 22/02 482/69 |
| 7,621,850 | B2 * | 11/2009 | Piaget | A63B 21/154 482/54 |
| 7,887,471 | B2 * | 2/2011 | McSorley | A63B 21/0552 482/136 |
| 8,002,674 | B2 * | 8/2011 | Piaget | A63B 23/0429 482/52 |
| 8,075,453 | B1 * | 12/2011 | Wilkinson | A63B 21/4019 482/8 |
| 8,550,962 | B2 * | 10/2013 | Piaget | A63B 22/04 482/52 |
| 9,259,603 | B2 * | 2/2016 | Wireman | A63B 71/023 |
| 9,358,413 | B2 * | 6/2016 | Verdi | A63B 21/4011 |
| 9,700,751 | B2 * | 7/2017 | Verdi | A63B 21/4017 |
| 9,808,668 | B2 * | 11/2017 | Bucher | A61H 1/0262 |
| 9,987,188 | B1 * | 6/2018 | Diao | A63B 24/0087 |
| 2005/0183759 | A1 * | 8/2005 | Wolfe | A61H 3/04 135/67 |
| 2012/0197168 | A1 * | 8/2012 | Agrawal | A63B 21/4009 602/19 |
| 2017/0027803 | A1 * | 2/2017 | Agrawal | A61B 5/1122 |
| 2018/0140496 | A1 * | 5/2018 | Sankai | A61H 1/0262 |
| 2020/0179752 | A1 * | 6/2020 | Fung | A63B 22/02 |
| 2021/0001171 | A1 * | 1/2021 | Fung | A61B 5/4842 |

FOREIGN PATENT DOCUMENTS

| | | |
|---|---|---|
| CN | 107773910 A | 3/2018 |
| EP | 3299002 A1 | 3/2018 |
| WO | 2014/081400 A2 | 5/2014 |
| WO | 2016/186182 A1 | 11/2016 |

* cited by examiner

WALKING TRAINING SYSTEM AND OPERATION METHOD

CROSS REFERENCE TO RELATED APPLICATIONS

This application is based upon and claims the benefit of priority from Japanese patent application No. 2019-189213, filed on Oct. 16, 2019, the disclosure of which is incorporated herein in its entirety by reference.

BACKGROUND

The present disclosure relates to a walking training system and an operation method.

International Patent Publication No. WO2016/186182 discloses a walking aid device including a treadmill. In International Patent Publication No. WO 2016/186182, two wires pull a user's waist obliquely from above. The waist is swung by a biaxial drive unit winding the wires. In FIG. 1, two winding units of the biaxial drive unit are coaxially connected. In FIG. 9, two winding units of the biaxial drive unit are disposed back and forth. International Patent Publication No. WO2016/186182 further discloses, in the paragraph 0052, that the biaxial drive apparatuses are provided at three or more locations.

International Patent Publication No. WO 2014/81400 discloses an apparatus including a treadmill and two rods. The two rods are disposed on the right and left sides of a user and support the user's pelvis. The rods are connected to a universal joint having two degrees of freedom.

SUMMARY

In such a system, it is desired to perform walking training more appropriately.

The present disclosure has been made to solve such a problem. An object of the present disclosure is to provide a walking training system and a method of operating the same capable of effectively performing walking training.

An example aspect is a walking training system including a harness attached to a trainee's pelvic girdle; at least three pulling units; and a control unit configured to control the at least three pulling units in such a way that a position of the harness in a horizontal plane becomes a target position. One of the at least three pulling units is a first pulling unit configured to apply a pulling force to the harness from front of the trainee, another one of the at least three pulling units is a second pulling unit configured to apply a pulling force to the harness from rear of the trainee, and another one of the at least three pulling units is a third pulling unit configured to apply a pulling force to the harness from a direction different from the first and second pulling units.

In the walking training system according to this aspect, the first to third pulling units may be configured to apply the pulling forces to the harness along a horizontal direction.

In the walking training system according to this aspect, each of the first to three pulling units may include: a wire connected to the harness; and a winding mechanism configured to wind the wire so as to apply the pulling force to the harness.

In the walking training system according to this aspect, each of the first to three pulling units may include a converter configured to convert an orientation of the wire.

The walking training system according to this aspect may further include handrails disposed along a walking direction and on right and left sides of the trainee, respectively. The first to third pulling units may be attached to the handrails.

In the walking training system according to this aspect, a pulling direction of each of the first to third pulling units may be in the same plane.

The walking training system according to this aspect may further include a fourth pulling unit configured to apply a pulling force to the harness. The first pulling unit may be disposed to left front of the trainee, the second pulling unit may be disposed to left rear of the trainee, the third pulling unit may be disposed to right front of the trainee, and the fourth pulling unit may be disposed to right rear of the trainee.

In the walking training system according to this aspect, the control unit may be configured to control the pulling units in such a way that the target position is dynamically changed.

In the walking training system according to this aspect, the target position may dynamically change independently in a front/rear direction and a right/left direction.

In the walking training system according to this aspect, the target position may dynamically change independently according to swinging of the trunk in the right/left direction and a movement of the trunk in the front/rear direction.

In the walking training system according to this aspect, an attaching position where the pulling unit is attached to the harness may be adjustable in a circumferential direction of the trunk.

Another example aspect is a method of operating a walking training system, the walking training system including: a harness attached to a trainee's trunk; a first pulling unit configured to apply a pulling force to the harness from front of the trainee; a second pulling unit configured to apply a pulling force to the harness from rear of the trainee; and a third pulling unit configured to apply a pulling force to the harness from a direction different from the first and second pulling units. The method includes: acquiring a target position of the harness in a horizontal plane, and controlling the first to third pulling units in such a way that a position of the harness becomes the target position.

The present disclosure provides a walking training system and a method of operating the same capable of effectively performing walking training.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described through an embodiment of the present disclosure, but the disclosure according to the claims is not limited to the following embodiment. Further, not all of the configurations described in the embodiment are indispensable as means for solving the problems.

Figure 1:
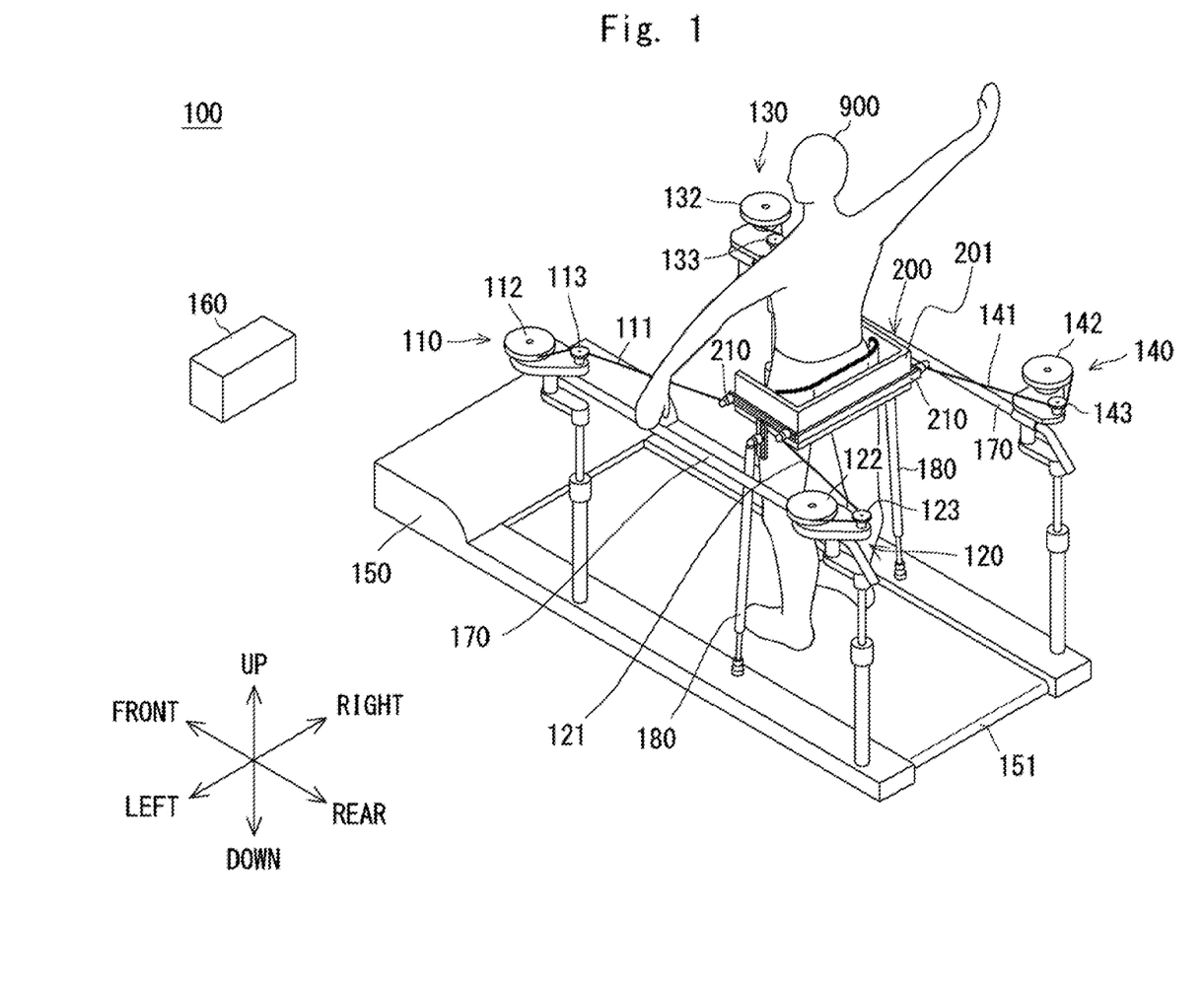
FIG. 1 is a schematic view of a walking training system according to an embodiment as viewed diagonally from the back left.
Figure 2:
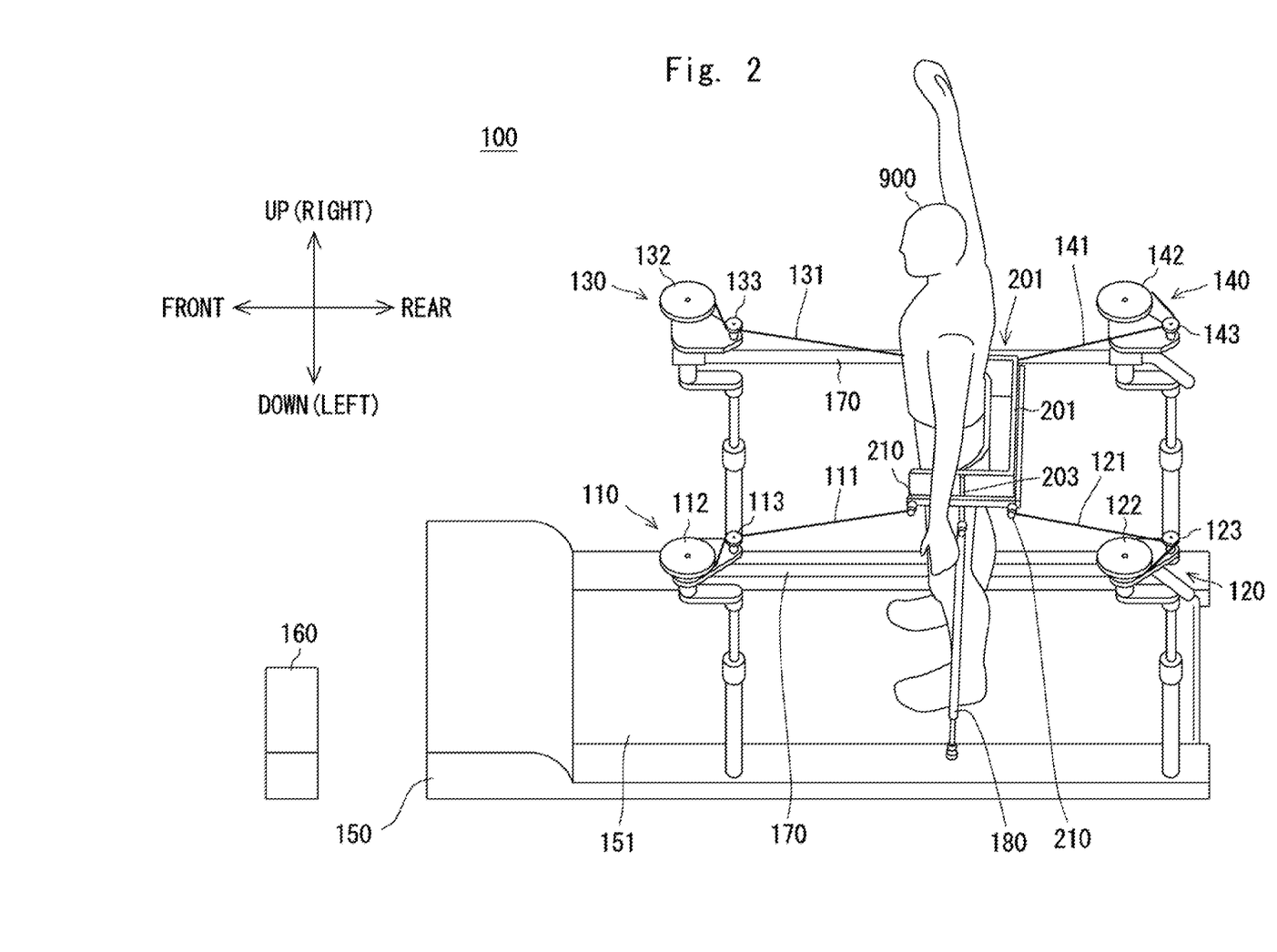
FIG. 2 is a schematic view of the walking training system according to the embodiment as viewed from the upper left.
Figure 3:
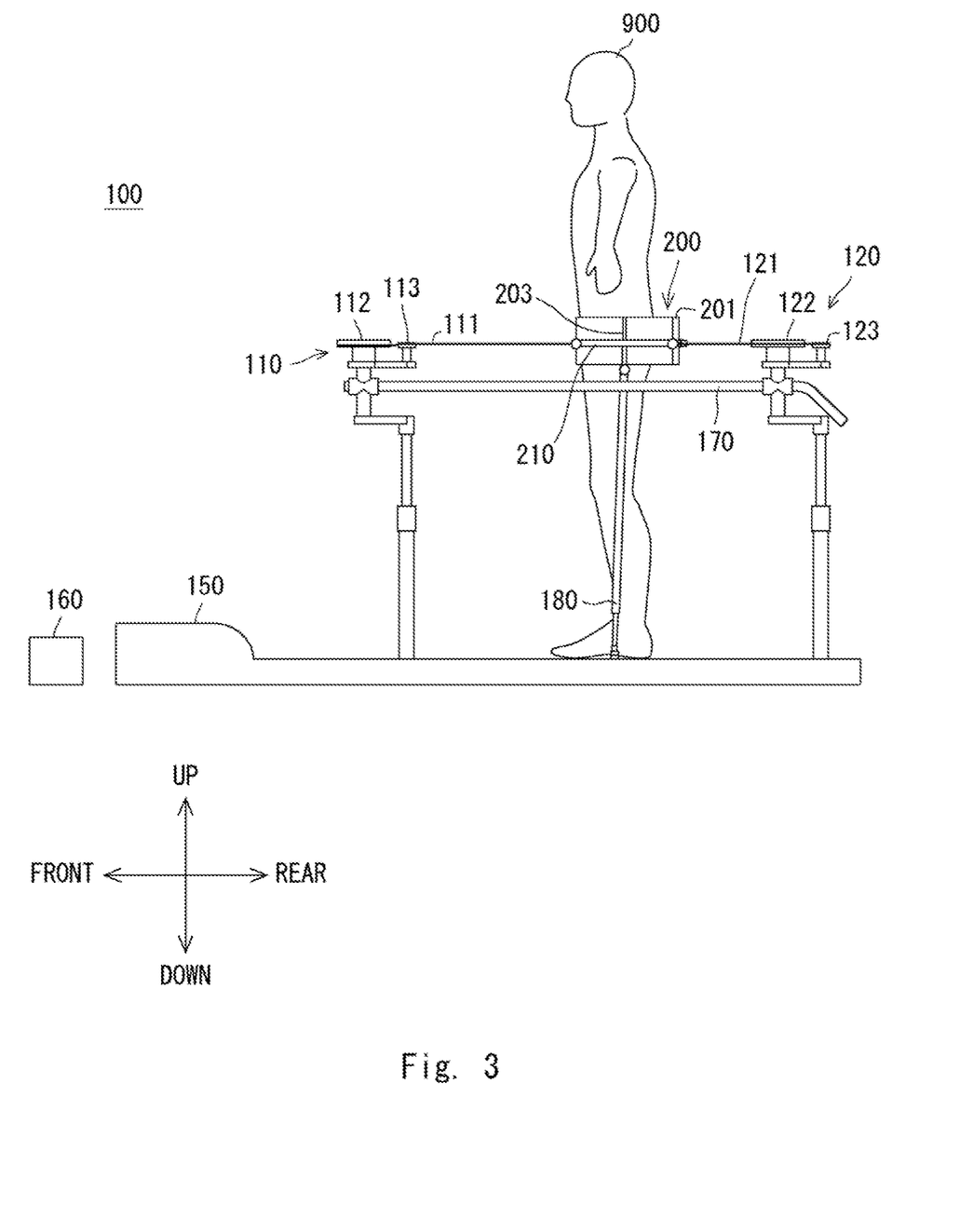
FIG. 3 is a side view of the walking training system according to the embodiment of the present disclosure.
Figure 4:
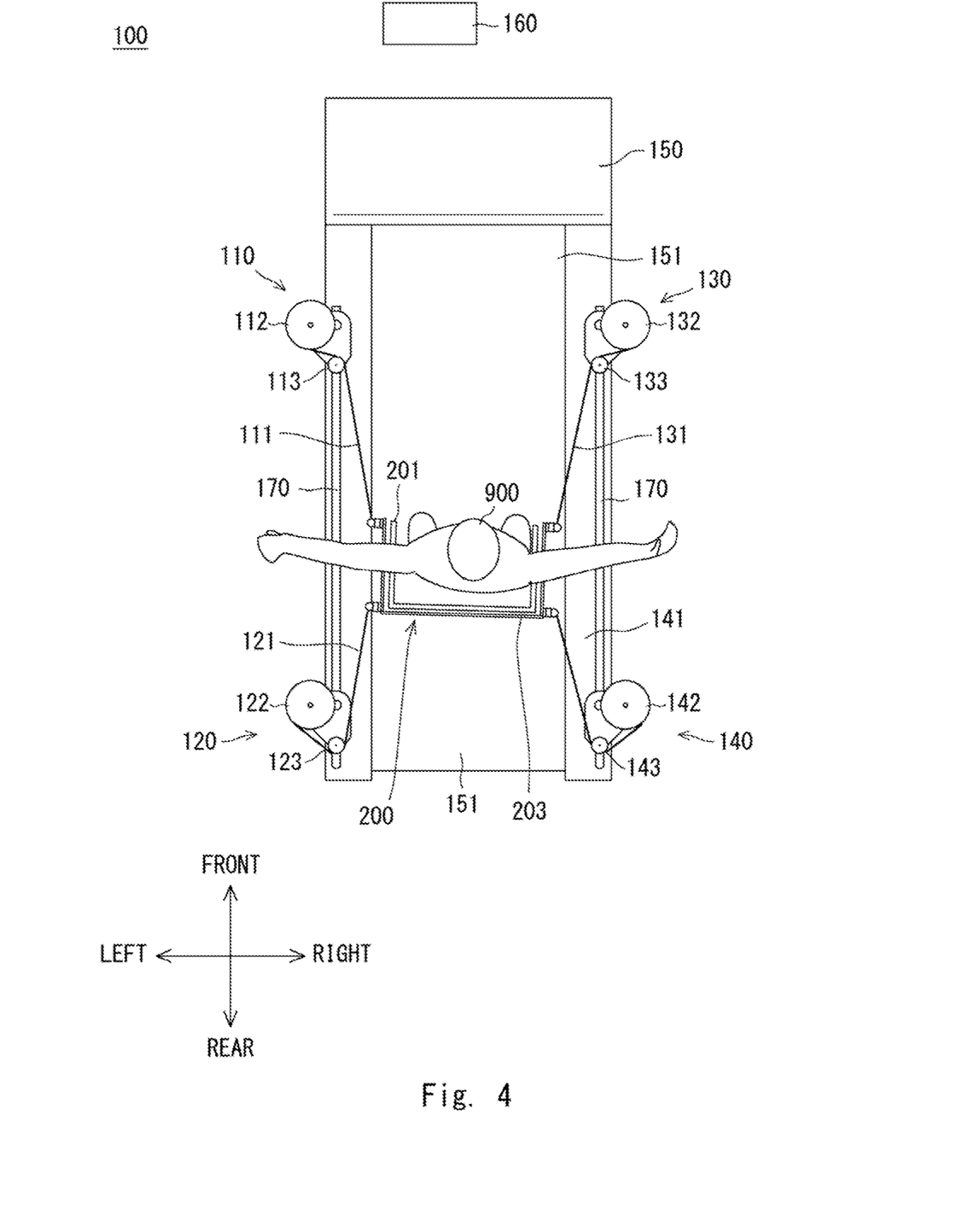
FIG. 4 is a top view of the walking training system according to the embodiment of the present disclosure.

Hereinafter, a walking training system 100 according to an embodiment will be described with reference to the drawings. FIG. 1 shows a walking training system 100 as viewed diagonally from the back left. FIG. 2 shows the walking training system 100 as viewed from the upper left. FIG. 3 is a side view of the walking training system 100 as viewed from the left. FIG. 4 is a top view of the walking training system 100. The walking training system 100 may also be referred to as a walking training apparatus.

The walking training system 100 includes a first pulling unit 110, a second pulling unit 120, a third pulling unit 130, a fourth pulling unit 140, a treadmill 150, a control unit 160, handrails 170, support rods 180, and a harness 200. The up/down direction, right/left direction, and front/rear direction in the following descriptions are directions with a walking direction of the trainee 900 as a reference.

The treadmill 150 rotates a ring-shaped belt 151 by a motor (not shown). The treadmill 150 is an apparatus for making the trainee 900 walk. The trainee 900, who performs walking training, gets on the belt 151 and tries to walk in accordance with the movement of the belt 151. The walking training system 100 is an apparatus by which the trainee 900, who is a hemiplegic patient suffering from paralysis of one of his/her legs, performs walking training under the guidance of a training staff member. The training staff member can be a physical therapist (PT) and may also be referred to as a training instructor, a training assistant, a training supporter, or the like, because he/she instructs the trainee in training or assists the trainee by giving assistance and the like.

The handrails 170 are disposed along the walking direction (front/rear direction). The handrails 170 are disposed on the right and left sides of the trainee 900. The handrails 170 become a fixing member fixed to a position near the harness 200. Specifically, the handrails 170 are fixed to the treadmill 150 by support pillars or the like. The handrails 170 may be provided at the same height as that of the trainee 900's pelvic girdle, namely, at the same height as that of the harness 200. The trainee 900 may perform walking training while grasping the handrails 170. Alternatively, the trainee 900 may perform walking training while standing on his/her own without grasping the handrails 170.

Each handrail 170 is disposed in a direction parallel to the walking direction of the trainee 900. The up/down position and the right/left position of the handrails 170 are adjustable. That is, the handrails 170 may include a mechanism for changing their heights and widths. Further, the handrails 170 can be configured in such a way that their inclination angles can be changed by, for example, adjusting the heights of their front sides so that the heights of the handrails 170 on the front side differ from the rear sides of the handrails 170 on the rear side in the walking direction. For example, the handrails 170 can have an inclination angle so that their heights gradually increase along the walking direction.

The harness 200 is a member attached to the trainee 900. The harness 200 includes a frame 201, a guide mechanism 203, and an attaching member 210. The harness 200 is attached to the trainee 900's trunk and supports his/her pelvic girdle. Specifically, the harness 200 is fixed to the trainee 900's waist, buttocks, pelvis, or abdomen by a belt or the like. The pulling forces applied by the first pulling unit 110 to the fourth pulling unit 140 assist the motions of the trainee 900's pelvis (pelvic girdle) or the like. The first to fourth pulling units 110 to 140 generate assisting forces to assist the motions of the trainee 900. The trunk is the body part and does not include the upper limbs, lower limbs, neck, and head. The part of the body to which the harness 200 is attached may include at least a part of the waist, the buttocks, pelvis, and abdomen.

The frame 201 is fixed to the trunk such as the trainee 900's pelvis. The trunk includes the buttocks. The first wire 111, the second wire 121, the third wire 131, and the fourth wire 141 are attached to the attaching member 210. The guide mechanism 203 guides up/down movement between the attaching member 210 and the frame 201. Thus, the attaching member 210 is held on the frame 201 with the guide mechanism 203 interposed therebetween so that the attaching member 210 can move up and down.

For example, the frame 201 is formed in a U-shape when viewed from above. The trainee 900 enters inside the frame 201. A belt or the like is provided on the inner surface of the frame 201. The trainee 900 can attach the harness 200 by winding the belt around his/her buttocks or the periphery of his/her buttocks. The frame 201 is formed of a rigid body such as metal or resin. The trainee 900's pelvic girdle is supported in this manner.

The guide mechanism 203 is provided on the outer surface of the frame 201. The guide mechanism 203 includes, for example, a guide rail provided along the up/down direction. The attaching member 210 is attached to the frame 201 with the guide mechanism 203 interposed therebetween. Thus, the position of the attaching member 210 relative to the frame 201 is variable in the up/down direction. That is, the attaching member 210 is held by the guide mechanism 203 movably in the up/down direction with respect to the frame 201. Even when the pelvic girdle is moved in the up/down direction by a walking motion, the pulling force becomes parallel to the horizontal direction.

The first wire 111, the second wire 121, the third wire 131, and the fourth wire 141 are connected to the attaching member 210. The attaching member 210 may include a hole, a hook, and the like for attaching a wire. Although the attaching positions where the first wire 111, the second wire 121, the third wire 131, and the fourth wire 141 are attached to the attaching member 210 are different from each other, some or all of the attaching positions may be the same. The pulling forces are applied to the frame 201 by the first wire 111, the second wire 121, the third wire 131, and the fourth wire 141. Thus, in the horizontal plane, the pulling forces can be applied to the harness 200 so that the pelvic girdle becomes a target position. It is also possible to appropriately assist a walking motion and to effectively perform walking training.

The two support rods 180 are provided between the harness 200 and the treadmill 150. The support rods 180 are attached to the right and left sides of the harness 200. The support rods 180 extend upward from the treadmill 150. That is, the support rods 180 are attached to the treadmill 150 on the left and right outer sides of the belt 151. The upper ends of the support rods 180 are fixed to the frame 201. The support rods 180 reduce the load of the harness 200. The support rods 180 can extend and contract and are tiltable. By the walking motion, the support rods 180 extend and contract while following the position of the frame 201. The support rods 180 may be passive joints, i.e., actuatorless. As the mechanism for tilting and extending/contracting the support rods 180, for example, a biaxial ball joint and a telescopic rod may be used.

The first pulling unit 110 includes the first wire 111, a first winding mechanism 112, and a first pulley 113. A distal end of the first wire 111 is tied to the harness 200. The first winding mechanism 112 and the first pulley 113 are fixed to the left handrail 170. The first winding mechanism 112 winds the first wire 111 so as to apply a pulling force to the harness 200. The first pulley 113 is provided between the first winding mechanism 112 and the harness 200. The first wire 111 extends from the first winding mechanism 112 to the harness 200 with the first pulley 113 interposed therebetween. The first pulley 113 converts an orientation of the first wire 111.

For example, the first winding mechanism 112 includes a reel around which the first wire 111 is wound, a motor for rotating the reel, and so on. The motor rotates the reel, which causes the reel to wind the first wire 111. In this way, the first pulling unit 110 applies a pulling force to the harness 200. The first pulling unit 110 applies a pulling force to the harness 200 from the left front. The pulling force applied by the first pulling unit 110 is defined as a first pulling force. The direction of the first pulling force is defined as a first pulling direction. The first pulling direction is a stretching direction of the first wire 111 from the first pulley 113 to the harness 200.

The second pulling unit 120 includes the second wire 121, a second winding mechanism 122, and a second pulley 123. A distal end of the second wire 121 is tied to the harness 200. The second winding mechanism 122 and the second pulley 123 are fixed to the left handrail 170. The second winding mechanism 122 winds the second wire 121 so as to apply a pulling force to the harness 200. The second pulley 123 is provided between the second winding mechanism 122 and the harness 200. The second wire 121 extends from the second winding mechanism 122 to the harness 200 with the second pulley 123 interposed therebetween. The second pulley 123 converts an orientation of the second wire 121.

For example, the second winding mechanism 122 includes a reel around which the second wire 121 is wound, a motor for rotating the reel, and so on. The motor rotates the reel, which causes the reel to wind the second wire 121. In this way, the second pulling unit 120 applies a pulling force to the harness 200. The second pulling unit 120 applies a pulling force to the harness 200 from the left rear. The pulling force applied by the second pulling unit 120 is defined as a second pulling force. The direction of the second pulling force is defined as a second pulling direction. The second pulling direction is a stretching direction of the second wire 121 from the second pulley 123 to the harness 200.

The third pulling unit 130 includes the third wire 131, a third winding mechanism 132, and a third pulley 133. A distal end of the third wire 131 is tied to the harness 200. The third winding mechanism 132 and the third pulley 133 are fixed to the right handrail 170. The third winding mechanism 132 winds the third wire 131 so as to apply a pulling force to the harness 200. The third pulley 133 is provided between the third winding mechanism 132 and the harness 200. The third wire 131 extends from the third winding mechanism 132 to the harness 200 with the third pulley 133 interposed therebetween. The third pulley 133 converts an orientation of the third wire 131.

For example, the third winding mechanism 132 includes a reel around which the third wire 131 is wound, a motor for rotating the reel, and so on. The motor rotates the reel, which causes the reel to wind the third wire 131. In this way, the third pulling unit 130 applies a pulling force to the harness 200. The third pulling unit 130 applies a pulling force to the harness 200 from the right front. The pulling force applied by the third pulling unit 130 is defined as a third pulling force. The direction of the third pulling force is defined as a third pulling direction. The third pulling direction is a stretching direction of the third wire 131 from the third pulley 133 to the harness 200.

The fourth pulling unit 140 includes the fourth wire 141, a fourth winding mechanism 142, and a fourth pulley 143. A distal end of the fourth wire 141 is tied to the harness 200. The fourth winding mechanism 142 and the fourth pulley 143 are fixed to the right handrail 170. The fourth winding mechanism 142 winds the fourth wire 141 so as to apply a pulling force to the harness 200. The fourth pulley 143 is provided between the fourth winding mechanism 142 and the harness 200. The fourth wire 141 extends from the fourth winding mechanism 142 to the harness 200 with the fourth pulley 143 interposed therebetween. The fourth pulley 143 converts an orientation of the fourth wire 141.

For example, the fourth winding mechanism 142 includes a reel around which the fourth wire 141 is wound, a motor for rotating the reel, and so on. The motor rotates the reel, which causes the reel to wind the fourth wire 141. In this way, the fourth pulling unit 140 applies a pulling force to the harness 200. The fourth pulling unit 140 applies a pulling force to the harness 200 from the right rear. The pulling force applied by the fourth pulling unit 140 is defined as a fourth pulling force. The direction of the fourth pulling force is defined as a fourth pulling direction. The fourth pulling direction is a stretching direction of the fourth wire 141 from the fourth pulley 143 to the harness 200.

Thus, the first wire 111, the second wire 121, the third wire 131, and the fourth wire 141 are connected to the harness 200. The control unit 160 controls the first pulling unit 110, the second pulling unit 120, the third pulling unit 130, and the fourth pulling unit 140 so that the first to fourth pulling forces are simultaneously applied to the harness 200. That is, the first pulling unit 110 applies the first pulling force to the harness 200, and the second pulling unit 120 applies the second pulling force to the harness 200. Thus, the second pulling force, together with the first pulling force, is applied to the harness 200. Further, the third pulling unit 130 and the fourth pulling unit 140 apply the third pulling force and the fourth pulling force to the harness 200. The third pulling force and the fourth pulling force, together with the first and second pulling forces, are applied to the harness 200.

When a resultant force of the first pulling force and the second pulling force is larger than a resultant force of the third pulling force and the fourth pulling force, the harness 200 moves to the left, while when the resultant force of the first pulling force and the second pulling force is smaller than the resultant force of the third pulling force and the fourth pulling force, the harness 200 moves to the right. When the resultant force of the first pulling force and the third pulling force is larger than the resultant force of the second pulling force and the fourth pulling force, the harness 200 moves forward, and when the resultant force of the first pulling force and the third pulling force is smaller than the resultant force of the second pulling force and the fourth pulling force, the harness 200 moves backward. Thus, the harness 200 in the horizontal plane can be set to a desired target position.

Although the first pulling unit 110, the second pulling unit 120, the third pulling unit 130, and the fourth pulling unit 140 pull the harness 200 using the wires and the reels, they may pull the harness 200 using other mechanisms. The first pulling unit 110, the second pulling unit 120, the third pulling unit 130, and the fourth pulling unit 140 may pull the harness 200 using a rod, a piston, or the like.

In the above description, the walking training system 100 includes four pulling units, but the number of pulling units may be two or more. For example, when one of the two pulling units is disposed in front of the trainee 900 and the other behind the trainee 900, the front and rear position of the harness 200 can be controlled. Alternatively, when one of the two pulling units is disposed on the left side of the trainee 900 and the other is disposed on the right side of the trainee 900, the right/left position of the harness 200 can be controlled. Further alternatively, three pulling units may be provided, and by applying pulling forces from different directions, the front/rear position and the right/left position of the harness 200 in the horizontal plane can be appropriately adjusted. As a matter of course, the number of pulling units may be five or more.

The control unit 160 is, for example, an MPU (Micro Processing Unit) and controls the overall operations of the apparatus by executing a control program loaded from a system memory. The control unit 160 controls the treadmill 150. Thus, the treadmill 150 operates at a desired walking speed. When the PT inputs a walking speed, the treadmill 150 operates at a constant speed. The control unit 160 is not limited to a physical single apparatus and may instead be a plurality of distributed apparatus. Further, part or all of the processing of the control unit 160 may be performed by a server apparatus or the like disposed at a remote place.

The control unit 160 controls the first pulling unit 110, the second pulling unit 120, the third pulling unit 130, and the fourth pulling unit 140. That is, the control unit 160 controls an actuator such as a motor to control an amount of winding or the pulling force of each wire. The first pulling unit 110, the second pulling unit 120, the third pulling unit 130, and the fourth pulling unit 140 independently control the amount of winding of each wire. By doing so, the control unit 160 can control the position of the harness 200. That is, the control unit 160 can control the position of the harness 200 so that the harness 200 follows the target position.

The control unit 160 controls the pulling forces acting on the harness 200 through the wires. Alternatively, the control unit 160 controls the movement (position control, speed control, etc.) of movable parts (actuator, wire winding unit, etc.) of the pulling units for generating the pulling forces acting on the harness 200 through the wires. The control unit 160 controls the first pulling unit 110, the second pulling unit 120, the third pulling unit 130, and the fourth pulling unit 140 so as to dynamically change the target position. The target position is dynamically changed independently in the front/rear direction and the right/left direction. The target position is dynamically changed independently according to the swing of the trunk in the right/left direction and according to the movement of the trunk in the front/rear direction. The control unit 160 may control each of the pulling units by position control or by speed control. Alternatively, the control unit 160 may control the respective pulling forces acting through the wires.

The control unit 160 may adjust the pulling force in the front/rear direction so that the front/rear position of the harness 200 in the walking direction follows the target position. The control unit 160 may adjust the pulling force in the right/left direction so that the right/left position of the harness 200 in the walking direction follows the target position. For example, the control unit 160 controls the first to fourth pulling forces in such a way that the front/rear position and the right/left position of the harness 200 are brought closer to the target position. The target position may be set for a yaw direction position (rotation angle about vertical axis).

The target position may be sequentially changed according to the time in one walking cycle. To be more specific, for example, the trajectory of the harness 200 or the pelvic girdle during the walking motion actually assisted by the PT or during the walking motion of the healthy person is measured in advance. The control unit 160 stores the trajectory as a target pattern in a memory or the like. The target pattern of the harness 200 in one walking cycle is determined in advance. In one walking cycle, the front/rear position, the right/left position, and the yaw direction position of the harness 200 change over time. That is, the front/rear position, the right/left position, and the yaw direction position of the harness 200 are associated with each time in the walking cycle. By sequentially changing the target position in one walking cycle, the movement of the trainee 900's pelvic girdle can be made closer to a desired movement. Thus, the walking training can be performed effectively.

In an operation method for operating the walking training system 100, the control unit 160 obtains the target position of the harness 200 in the horizontal plane. The control unit 160 controls the first pulling unit 110, the second pulling unit 120, the third pulling unit 130, and the fourth pulling unit 140 so that the position of the harness 200 becomes the target position in the horizontal plane. The control can be easily performed, and walking training can be effectively performed. The walking training system 100 may also include a sensor for detecting a timing of the walking cycle. As the sensor for detecting the timing of the walking cycle, a camera, a motion sensor, or the like may be used.

The first to fourth pulling forces are preferably oriented along the horizontal direction, and more preferably parallel to the horizontal direction. That is, the first wire 111, the second wire 121, the third wire 131, and the fourth wire 141 are preferably oriented in the horizontal direction, more preferably parallel to the horizontal direction. By doing so, walking training can be performed without greatly changing the load on the trainee 900 in the gravity direction (vertical up/down direction). For example, in order to increase the amount of movement of the harness 200 in the horizontal plane, it is necessary to increase the pulling force. When each wire pulls the harness 200 obliquely from above, if an upward pulling force is generated, the load is reduced by a weight equivalent to that of the trainee 900. When a large pulling force is applied to the harness 200 obliquely from above, the load of the harness 200 is reduced more than necessary. Since the level of difficulty of training is lowered, effective training may not be possible.

The first to fourth pulling directions may be inclined from a direction parallel to the horizontal plane. The first to fourth pulling directions may be any direction along the horizontal plane. That is, the direction along the horizontal direction is not limited to the direction parallel to the horizontal direction and instead includes a direction close to the horizontal direction. For example, it is preferable that an elevation angle of the first to fourth pulling forces be within the range of ±30 degrees or less, and more preferably within the range of ±15 degrees. Further, the elevation angle of the first to fourth pulling forces may be within a range of ±5 degrees. The horizontal direction is along a plane vertical to the direction of gravity. That is, the horizontal direction is a direction in the horizontal plane orthogonal to the gravity direction. The first to fourth pulling directions are not limited to the direction parallel to the horizontal direction, and instead may be a direction along the walking surface. For example, when the inclination of the treadmill 150 is variable, the walking surface is inclined from the horizontal plane. When the walking surface is inclined from the horizontal plane, the first to fourth pulling directions may be parallel to the walking surface. When the treadmill 150 is not inclined, the walking surface becomes parallel to the horizontal plane.

The first wire 111, the second wire 121, the third wire 131, and the fourth wire 141 may pull the harness from a position lower than the trainee 900's height. For example, the pulley is preferably positioned at a position lower than the trainee 900's height, and more preferably at the same height as the trunk of the trainee 900. The first to fourth pulling directions are preferably in the same horizontal plane. The first to fourth pulling directions may be in the same plane inclined from the horizontal plane.

The handrails 170 are provided on the right and left sides of the harness 200. The handrails 170 become a fixing member fixed to a position near the trainee 900. The first pulling unit 110, the second pulling unit 120, the third pulling unit 130, and the fourth pulling unit 140 are attached to the handrails 170. In this way, a pulling force along the horizontal direction can be applied to the harness 200 with such a simple configuration.

As a matter of course, the first pulling unit 110, the second pulling unit 120, the third pulling unit 130, and the fourth pulling unit 140 may be attached to a fixing member other than the handrails 170. That is, when the fixing member is positioned at the horizontal position of the trainee 900's pelvic girdle, the first pulling unit 110, the second pulling unit 120, the third pulling unit 130, and the fourth pulling unit 140 can be attached to this fixing member. For example, if the walking training system 100 includes a frame, the first pulling unit 110, the second pulling unit 120, the third pulling unit 130, and the fourth pulling unit 140 can be provided on the frame. Such a fixing member is preferably positioned lower than the trainee 900. To be specific, a fixing member such as the handrails 170 is preferably positioned at the same height as that of the trainee 900's trunk or the harness 200.

The first pulling direction is set by the position of the first pulley 113. That is, the direction of the first pulling force can be determined by a straight line connecting the first pulley 113 to the harness 200. Only the first pulley 113 may be provided on the handrail 170. In other words, the first winding mechanism 112 may be positioned above the harness 200. That is, when the first pulley 113 changes the orientation of the first wire 111, the horizontal component of the first pulling force with respect to the harness 200 can be increased.

The first pulley 113, the second pulley 123, the third pulley 133, and the fourth pulley 143 are preferably disposed to increase the horizontal component of the first to fourth pulling forces. For example, the direction from the first pulley 113 to the harness 200 is closer to the horizontal direction than the direction from the first winding mechanism 112 to the first pulley 113. The first winding mechanism 112 can be disposed above the harness 200. In this case, the first winding mechanism 112 can be disposed on something other than the handrail 170. The first pulley 113 is preferably disposed to increase the horizontal component of the first pulling force.

Likewise, the second, third, and fourth pulling forces can be set by the second pulley 123, the third pulley 133, and the fourth pulley 143 for the second pulling unit 120, the third pulling unit 130, and the fourth pulling unit 140, respectively. The second pulley 123, the third pulley 133, and the fourth pulley 143 can increase the horizontal component of the second pulling force, the third pulling force, and the fourth pulling force on the harness 200, respectively. In this case, the second winding mechanism 122, the third winding mechanism 132, and the fourth winding mechanism 142 can be disposed on something other than the handrail 170.

As discussed above, the first pulley 113, the second pulley 123, the third pulley 133, and the fourth pulley 143 serve as converters for converting the orientation of the pulling force so as to increase the horizontal component of the pulling forces. A converter other than the pulley may be used to convert the orientation of the pulling force, as a matter of course. The converter may be any device capable of converting the direction of the pulling force from the first direction into the second direction. The second direction is closer to the horizontal direction than the first direction. The second direction is the first to fourth pulling directions.

The fixing member fixed to a position near the harness 200 can be used as a converter. To be more specific, a fixing member such as the handrails 170 can be used as a converter to change the orientation of the wire. In this case, a wire from the winding mechanism may be connected to the harness 200 with the handrail 170 interposed therebetween. As a matter of course, if there is a fixing member other than the handrail 170 beside the harness 200, the fixing member may be used as a converter. When a converter such as a pulley is used, the winding mechanism may be disposed at a position higher than the trainee 900's height.

When the harness 200 is moved up and down, a position of the attaching member 210 relative to the frame 201 is changed. Specifically, the position of the attaching member 210 relative to the frame 201 is variable in the up/down direction. With such a configuration, the first to fourth pulling directions can be made horizontal.

For example, when the upper and lower positions of the pelvic girdle are changed by a walking motion of the trainee 900, the height of the frame 201 is changed. That is, the upper and lower positions of the frame 201 are changed according to the movement of the pelvic girdle during the walking motion. In this case, since the frame 201 moves up and down along the guide mechanism 203, it is possible to prevent the height of the attaching member 210 from changing. The change of the height of the attaching member 210 with respect to the walking surface can be reduced. Thus, it is possible to always apply the pulling force in the horizontal direction.

The training can be performed with an appropriate load by preventing the first pulling unit 110, the second pulling unit 120, the third pulling unit 130, and the fourth pulling unit 140 from applying a pulling force in the up/down direction. For example, when the first to fourth pulling forces have a component in the upward direction, the load of the harness 200 is reduced more than necessary. Alternatively, for example, when the first to fourth pulling forces have a component in the downward direction, a load is applied more than necessary. By preventing the first pulling unit 110, the second pulling unit 120, the third pulling unit 130, and the fourth pulling unit 140 from applying a pulling force in the up/down direction, an appropriate load can be applied.

The first pulling unit 110, the second pulling unit 120, the third pulling unit 130, and the fourth pulling unit 140 are fixed to the handrails 170. Thus, the first to fourth pulling forces can be set to an appropriate direction with a simple configuration. It is preferable that the first pulling unit 110, the second pulling unit 120, the third pulling unit 130, and the fourth pulling unit 140 always apply pulling forces while the trainee 900 is walking. By doing so, the load of the attaching member 210 can be reduced. Even in the absence of the support rods 180, it is possible to prevent the harness 200 from falling.

It is preferable that the first pulling unit 110 and the third pulling unit 130 be disposed symmetrically. It is preferable that the second pulling unit 120 and the fourth pulling unit 140 be disposed symmetrically. As shown in FIG. 4, the first wire 111, the second wire 121, the third wire 131, and the fourth wire 141 are fixed to the left front, left rear, right front, and right rear corners of the harness 200 when viewed from above. However, the position where the wire is fixed is not limited in particular.

The positions where the wires are fixed to the attaching member 210 may be variable. More specifically, the attaching positions where the pulling units are attached to the attaching member 210 may be adjustable in the circumferential direction of the trunk. For example, hooks for attaching the wires may be disposed circumferentially side by side. The attaching positions can be variable by changing the hooks for attaching the wires. That is, any attaching position may be selected to attach the wire. Alternatively, a guide mechanism for moving an attaching part such as a hook may be provided along the circumferential direction. Thus, the first to fourth pulling directions can be appropriately changed by making the attaching positions where the first pulling unit 110, the second pulling unit 120, the third pulling unit 130, and the fourth pulling unit 140 are attached to the harness 200 adjustable. For example, the ratio of the right/left direction component to the front/rear direction component in the pulling force can be changed. It is possible to adjust the first to fourth pulling directions according to the situation such as the content of the training and the trainee's physical build.

In the above description, although the number of the pulling units is four, the number of the pulling units may be two or more. Although the number of pulling units is preferably at least three, it may be two.

The attaching member 210 may be provided to each of the first wire 111, the second wire 121, the third wire 131, and the fourth wire 141. That is, four attaching members may be provided on the frame 201, and the first wire 111, the second wire 121, the third wire 131, and the fourth wire 141 may be separately connected. In this case, even if the frame 201 is tilted back and forth or right and left, the first to fourth pulling directions can be made horizontal. Alternatively, the first wire 111, the second wire 121, the third wire 131, and the fourth wire 141 may be attached to the integral attaching member 210.

The program executed by the control unit 160 may be stored and provided to a computer using various types of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above embodiment, and can be modified as appropriate without departing from the scope of the present invention.

From the disclosure thus described, it will be obvious that the embodiment of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A walking training system comprising:
    a harness configured to be attached to a trainee's trunk;
    at least three pulling units including first to third wires; and
    a control unit configured to control the at least three pulling units in such a way that a position of the harness in a horizontal plane becomes a target position; wherein
        one of the at least three pulling units is a first pulling unit configured to apply a pulling force to the harness from front of the trainee,
        another one of the at least three pulling units is a second pulling unit configured to apply a pulling force to the harness from rear of the trainee,
        another one of the at least three pulling units is a third pulling unit configured to apply a pulling force to the harness from a direction different from the first and second pulling units,
        the harness includes a guide mechanism, an attaching member, and a frame that is configured to be fixed to the trunk,
        the first to the third wires are attached to the attaching member,
        the guide mechanism is configured to guide up/down movement between the attaching member and the frame, and
        the guide mechanism includes a guide rail provided along an up/down direction.

2. The walking training system according to claim 1, wherein
    the first to third pulling units are configured to apply the pulling forces to the harness along a horizontal direction.

3. The walking training system according to claim 1, wherein
    each of the first to three pulling units comprises:
        a winding mechanism configured to wind the wire so as to apply the pulling force to the harness.

4. The walking training system according to claim 3, wherein
    each of the first to three pulling units comprises a converter configured to convert an orientation of the wire.

5. The walking training system according to claim 1, further comprising handrails disposed along a walking direction and on right and left sides of the trainee, respectively, wherein
    the first to third pulling units are attached to the handrails.

6. The walking training system according to claim 1, wherein
    pulling directions of the first to third pulling units are in the same plane.

7. The walking training system according to claim 1, further comprising a fourth pulling unit configured to apply a pulling force to the harness, wherein
    the first pulling unit is disposed to left front of the trainee,
    the second pulling unit is disposed to left rear of the trainee, the third pulling unit is disposed to right front of the trainee, and the fourth pulling unit is disposed to right rear of the trainee.

8. The walking training system according to claim 1, wherein the control unit is configured to control the pulling units in such a way that the target position is dynamically changed.

9. The walking training system according to claim 8, wherein the target position is dynamically changed independently in a front/rear direction and a right/left direction.

10. The walking training system according to claim 9, wherein the target position is dynamically changed independently according to swinging of the trunk in the right/left direction and a movement of the trunk in the front/rear direction.

11. The walking training system according to claim 1, wherein an attaching position where the pulling unit is attached to the harness is adjustable in a circumferential direction of the trunk.

12. A method of operating a walking training system, the walking training system comprising:

a harness configured to be attached to a trainee's trunk;

a first pulling unit configured to apply a pulling force to the harness from front of the trainee by a first wire;

a second pulling unit configured to apply a pulling force to the harness from rear of the trainee by a second wire; and a third pulling unit configured to apply a pulling force to the harness from a direction different from the first and second pulling units by a third wire, the method comprising:

acquiring a target position of the harness in a horizontal plane, and controlling the first to third pulling units in such a way that a position of the harness becomes the target position, wherein:

the harness includes a guide mechanism, an attaching member, and a frame that is configured to be fixed to the trunk, the first to the third wires are attached to the attaching member, the guide mechanism is configured to guide up/down movement between the attaching member and the frame, and the guide mechanism includes a guide rail provided along an up/down direction.

13. A non-transitory computer-readable storage medium storing a program that causes a computer to execute a method of operating a walking training system, the walking training system comprising:

a harness configured to be attached to a trainee's trunk;

a first pulling unit configured to apply a pulling force to the harness from front of the trainee by a first wire;

a second pulling unit configured to apply a pulling force to the harness from rear of the trainee by a second wire; and a third pulling unit configured to apply a pulling force to the harness from a direction different from the first and second pulling units by a third wire, the method comprising:

acquiring a target position of the harness in a horizontal plane, and controlling the first to third pulling units in such a way that a position of the harness becomes the target position, wherein:

the harness includes a guide mechanism, an attaching member, and a frame that is configured to be fixed to the trunk, the first to the third wires are attached to the attaching member, the guide mechanism is configured to guide up/down movement between the attaching member and the frame, and the guide mechanism includes a guide rail provided along an up/down direction.

* * * * *